3,485,661
POLYAMIDE AND POLYESTER FABRICS
TREATED WITH ISOCYANATE FUNC-
TIONAL SILOXANES
James K. Campbell and Roberta C. Richter, Midland,
Mich., assignors to Dow Corning Corporation, Mid-
land, Mich., a corporation of Delaware
No Drawing. Filed Sept. 16, 1966, Ser. No. 579,839
Int. Cl. D06m 15/66
U.S. Cl. 117—138.8                                8 Claims

ABSTRACT OF THE DISCLOSURE

Polyamide and polyester fabrics having improved tear strength, abrasion resistance, water resistance (hydrostatic head), hand, and/or coating adhesion are disclosed. The improved fabrics are obtained by treating them with an isocyanate functional siloxane of the formula

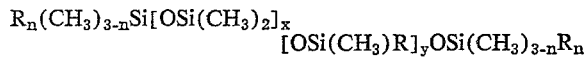

wherein R is a radical attached to the silicon atom via a nonhydrolyzable bond and contains at least one isocyanate group, each $n$ is 0 or 1, $x$ and $y$ are integers, and the sum of $x$ and $y$ is in the range of 14 to 300.

---

This invention relates to polyamide and polyester fabrics having improved tear strengths and water resistance. This invention further relates to a process for preparing these improved fabrics.

More specifically, this invention relates to a fabric selected from the group consisting of polyamide and polyester fabrics having a coating thereon of a cured siloxane of the average general formula

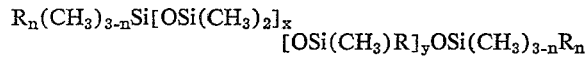

wherein R is a radical attached to the silicon atom via a non-hydrolyzable bond and contains at least one isocyanate group, each $n$ is zero or one, $x$ and $y$ are integers, and the sum of $x$ and $y$ is in the range of 14 to 300.

This invention also relates to a process for preparing an improved fabric selected from the group consisting of polyamide and polyester fabrics which process comprises applying to the fabric a siloxane of the average general formula

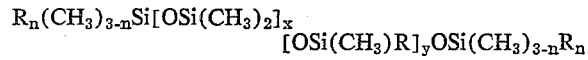

wherein R is a radical attached to the silicon atom via a non-hydrolyzable bond and contains at least one isocyanate group, each $n$ is zero or one, $x$ and $y$ are integers, and the sum of $x$ and $y$ is in the range of 14 to 300, and thereafter curing the siloxane.

It is an object of this invention to provide polyamide and polyester fabrics having improved tear strengths, abrasion resistance, water resistance (hydrostatic head), hand and coating adhesion. It is another object of this invention to provide a process for treating polyamide and polyester fabrics whereby the above characteristics are imparted thereto. Still another object of this invention is to provide improved polyamide and polyester fabrics for making inflatable structures, tents, tarps, shower curtains, sheets, umbrellas, and clothing such as stockings, jackets, raincoats, hunting outfits and military ponchos which possess the above improved properties. Other objects and advantages of this invention will be obvious to those skilled in the art from the following detailed description of the invention.

The polyamide and polyester fabrics are well known materials in the art and are commercially available. The polyamides, commonly called nylon, are prepared from dicarboxylic acids and diamines by condensation polymerization whereas the polyesters are prepared from dicarboxylic acids (or their esters) and glycols by condensation polymerization. The polymers that make up these fabrics are essentially long chain linear molecules.

The key to the improved fabrics of this invention is the siloxane coating. The siloxanes useful herein can be broadly defined as isocyanate functional siloxanes and are restricted to those of the average general formula

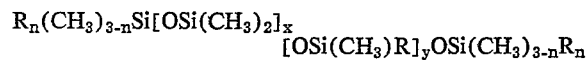

These siloxanes are known materials and can be prepared by the processes set forth in detail in U.S. Patents 3,170,891 and 3,179,622, the disclosures of which are incorporated herein by reference.

In the above formula R is a radical attached to the silicon atom via a nonhydrolyzable bond (Si—C bond) and must contain at least one isocyanate (NCO) group. Other than these two critical limitations, the R radical can contain any other substituents or linkages which are not detrimental to the fabrics.

It will be noted from the definitions of $n$, $x$ and $y$, supra, that the isocyanate functionality (i.e., the R radicals) can be present as end-blocking, pendant along the siloxane chain, or a combination of these. So far as is known at this time, best results are obtained when end-blocked materials are used. Stated another way, the preferred siloxanes in accordance with this invention are those as defined by the above formula in which each $n$ is 1 and $y$ is zero.

It should be noted that the exact properties imparted to the fabric can be controlled by the length of the siloxane chain, that is, the values of $x$ and $y$. Generally speaking, the tear strength increases and the hand becomes softer and silkier as the value of $x$ increases, while the adhesion, water resistance and abrasion resistance are better as the value of $x$ decreases and the value of $y$ increases. While the sum of $x$ and $y$ can range from 14 to 300, best results are obtained when their sum is in the range of 25 to 75.

While the fabric of this invention is defined as being "coated" with the cured siloxane, it should be clearly understood that the term "coated" (or "coating") is used herein to mean, and is intended to include, fabric which is either partially or completely covered and/or impregnated with the siloxane. For best results, particularly water resistance, a continuous film of the siloxane on the fabric is desirable.

The siloxanes can be applied to the fabric by any of the conventional means for applying coatings. For example, the siloxanes can be applied to the fabric by spraying, brushing, padding, or dipping procedures all of which are well known to those skilled in the art. For best results, it is preferred that the siloxane be applied to the fabric from a solvent solution. After the siloxane has been applied to the fabric and the solvent evaporated (assuming one has been used) the siloxane cures via the isocyanate groups upon exposure to atmospheric moisture. If one wishes to speedup the cure of the siloxane, any of the well known isocyanate catalysts can be incorporated therein. Illustrative of these catalysts are the amines and organometallic salts, for example, triethylenediamine, triethylamine, dibutyltindilaurate, and cobalt naphthenate. While curing of the siloxane will proceed at room temperature, it is generally preferred to heat the siloxane coated fabric at a moderate temperature, say around 100° C.

The amount of the siloxane applied to the fabric will vary considerably depending on the weight of the fabric, the specific properties desired, and the intended use of the fabric. Generally speaking, enough siloxane must be applied to provide a continuous film. This will amount to a dry pickup of about 15% siloxane. There is no maximum amount (above that which will provide a continuous film) that can be applied except the limit imposed by practical considerations such as economics and desired properties.

As with most organic coatings, antioxidants, ultraviolet light absorbers and other conventional additives can be incorporated with the siloxanes of this invention where they are beneficial.

Now in order that those skilled in the art may better understand how the present invention can be practiced, the following examples are given by way of illustration and not by way of limitation.

In the examples the tear strengths were measured in accordance with ASTM test D-39-61 (Tongue Method).

The hydrostatic-head test was Military Specification 5512:15 May 1951. The abrasion resistances were measured by the "Inflated Diaphragm (Stoll) Method" which is described in Military Specification 5302.1, January 25, 1956, and ASTM Test D1175–61T, with 200 cycles being used and with the exception that six pounds of air pressure were used instead of four.

It should be noted that while for the sake of simplicity the siloxanes are shown as if prepared from a single isocyanate, commercial mixtures of toluene diisocyanate for example, were employed and the claims are intended to cover such mixtures as well as siloxanes prepared from pure isocyanates.

All parts and percents referred to herein are on a weight basis unless otherwise specified.

The following siloxanes were employed in the examples below:

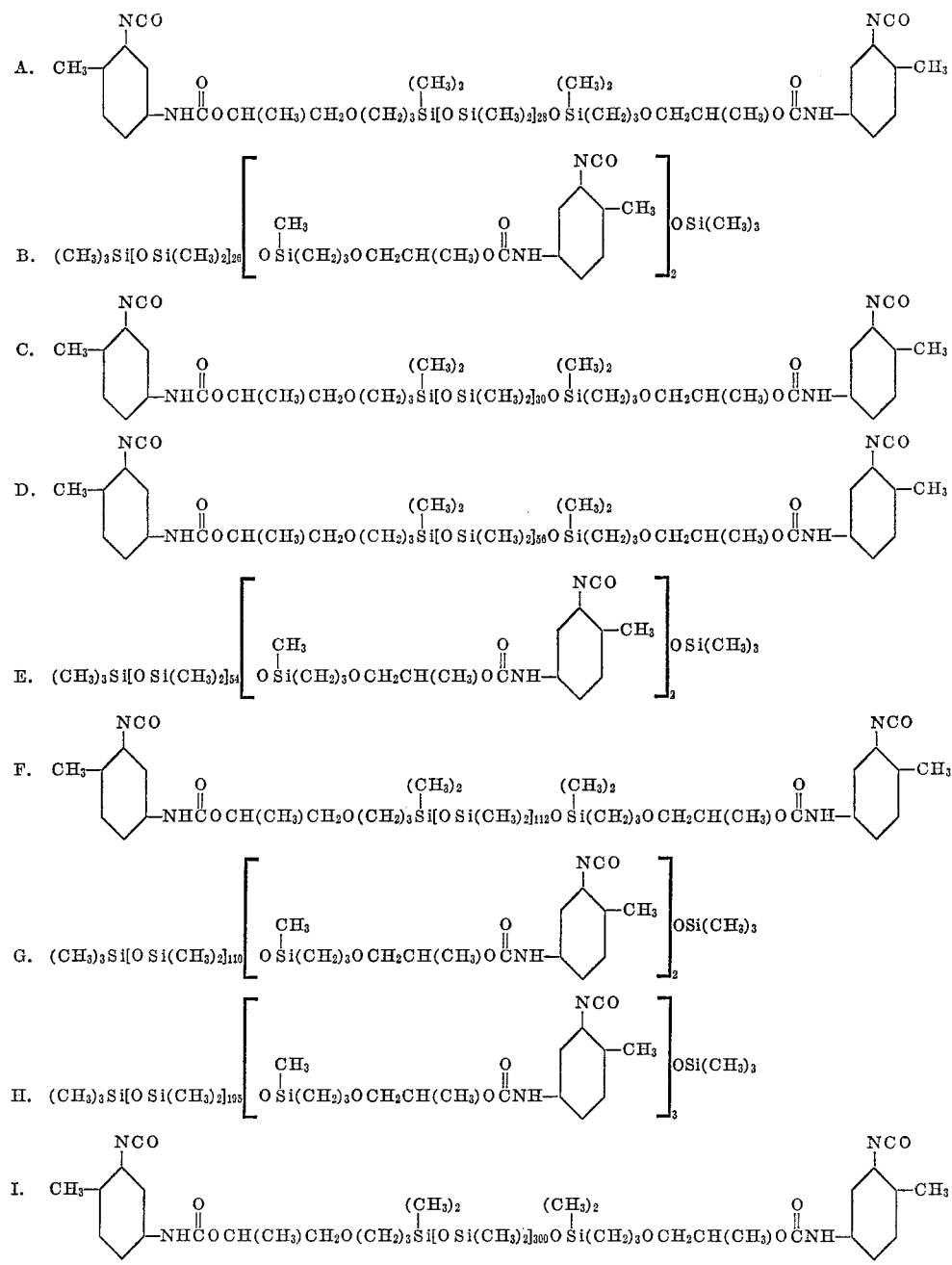

EXAMPLE 1

Xylene solutions containing varying amounts of some of the above siloxanes were prepared and then 2% stannous octoate, based on the siloxane solids, was added thereto as a catalyst. A commercial polyamide fabric (2.1 ounce per square yard) was immersed in this solution and the excess coating removed by drawing the fabric under the knife edge of a laboratory coater. The solvent was allowed to evaporate from the fabric and then the fabric placed in a 100° C. air circulating oven for ten minutes. The physical properties of the fabric were then measured and compared to the properties of uncoated fabric. The results of these tests are set forth in the table below. The tear strengths in this example were measured in the fill direction. The siloxane employed, the percent solids in the solution, and the dry pickup of the siloxane on the fabric are also set forth in the table.

| Siloxane | Percent solids | Dry pickup (oz./yd.²) | Hydrostatic-head (lbs.) Un-abraded | Abraded | Tear strength (lbs.) |
|---|---|---|---|---|---|
| None | | | 0 | 0 | 2.0 |
| B | 60 | 1.07 | 80 | 77 | 13.3 |
| D | 30 | 1.03 | 198 | 163 | 10.8 |
| E | 60 | 0.95 | 114 | 109 | 19.6 |
| G | 60 | 0.78 | 106 | 37 | 17.1 |
| I | 33 | 1.48 | 90 | 75 | 17.5 |

EXAMPLE 2

The procedure of Example 1 was repeated except that all 60% siloxane solids solutions were used, a 2.7 ounce per square yard commercial polyamide fabric was used, and all tear strengths were measured in the warp direction. In some instances a different catalyst, an ultraviolet light absorber, or an antioxidant was used. These instances are noted in the table below which also contains the test results.

| Siloxane | Dry pickup (oz./yd.²) | Hydrostatic-head (lbs.) Unabraded | Abraded | Tear strength (lbs.) |
|---|---|---|---|---|
| None | | 0 | 0 | 6.0 |
| A | 1.12 | 211 | 175 | 5.9 |
| A¹ | 1.09 | 240 | 192 | 6.9 |
| D | 1.18 | 151 | 146 | 17.1 |
| D² | 1.0 | 260 | 205 | 14.8 |
| D³ | 0.96 | 270 | 227 | 11.6 |
| F | 0.92 | 82 | 73 | 20.4 |
| H | 1.34 | 165 | 96 | 16.6 |

¹ Contained 1.5% dibenzylresorcinol as an ultraviolet light absorber.
² Contained 1.0% 4,4'-methylenebis(2,6-ditertiarybutyl phenol) as an antioxidant.
³ Contained 1% triethylenediamine as the catalyst.

EXAMPLE 3

The procedure of Example 1 was repeated except that a 2.6 ounce per square yard commercial polyester fabric was used. The test results are set forth in the following table.

| Siloxane | Percent solids | Dry pickup (oz./yd.²) | Hydrostatic-head (lbs.) Un-abraded | Abraded | Tear strength (lbs.) |
|---|---|---|---|---|---|
| None | | | 0 | 0 | 5.1 |
| C | 30 | 1.01 | 180 | 172 | 13.9 |
| D | 30 | 1.00 | 191 | 192 | 16.0 |
| H | 60 | 1.47 | 165 | 96 | 24.7 |

EXAMPLE 4

The procedure of Example 3 was repeated except that a 3.1 ounce per square yard commercial polyester fabric was used. In some instances a different catalyst, an ultraviolet light absorber, or an antioxidant was used. These instances are noted in the table below which also contains the test results.

| Siloxane | Percent solids | Dry pickup (oz./yd.²) | Hydrostatic-head (lbs.) Un-abraded | Abraded | Tear strength (lbs.) |
|---|---|---|---|---|---|
| None | | | 0 | 0 | 5.3 |
| A¹ | 60 | 0.65 | 80 | 71 | 10.1 |
| A² | 60 | 0.74 | 153 | 91 | 10.5 |
| D+H (blend) | 60 | 0.99 | 121 | 80 | 15.3 |
| D³ | 60 | 0.67 | 173 | 161 | 19.2 |
| E³ | 60 | 0.84 | 75 | 55 | 16.3 |
| F³ | 60 | 1.08 | 133 | 125 | 22.1 |
| F⁴ | 60 | 0.78 | 109 | 98 | 19.2 |

¹ Contained 1% lead octoate as the catalyst.
² Contained 1.5% dibenzylresorcinol as ultraviolet light absorber.
³ Contained 1% triethylenediamine as the catalyst.
⁴ Contained 1% 4,4'-methylenebis(tertiarybutyl methyl-phenol) as an antioxidant.

EXAMPLE 5

When the following siloxanes are substituted for the siloxanes of the previous examples, similar results are obtained.

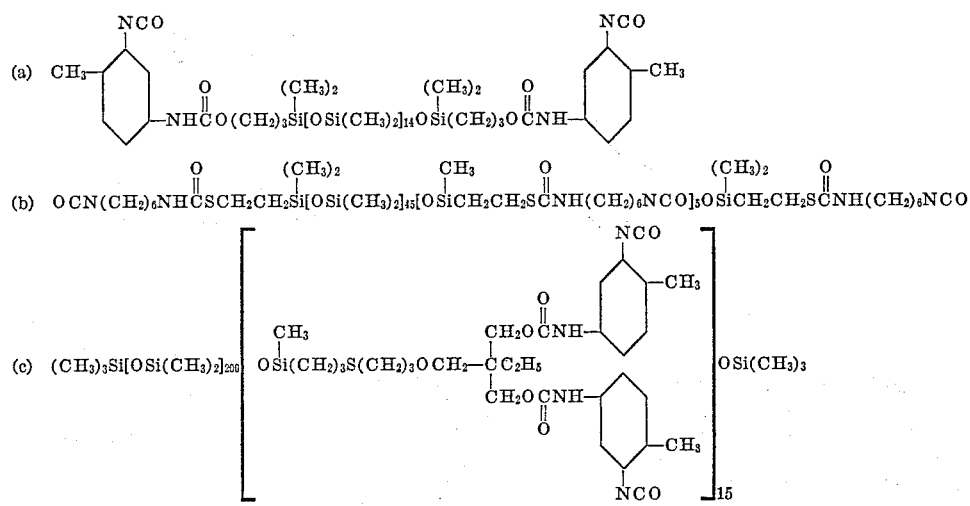

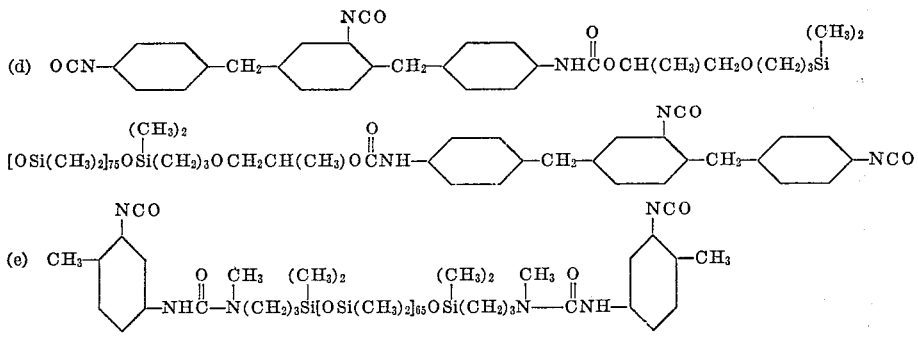

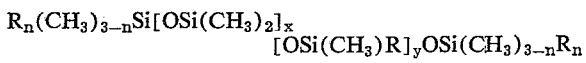

That which is claimed is:
1. A fabric selected from the group consisting of polyamide and polyester fabrics having a coating thereon of a cured siloxane of the average general formula $$R_n(CH_3)_{3-n}Si[OSi(CH_3)_2]_x[OSi(CH_3)R]_yOSi(CH_3)_{3-n}R_n$$

wherein
R is a radical attached to the silicon atom via a non-hydrolyzable bond and contains at least one isocyanate group, each
n is zero or one,
x and y are integers, and the sum of x and y is in the range of 14 to 300,
said fabric having improved tear strength, abrasion resistance, water resistance, hand, or coating adhesion.

2. A fabric as defined in claim 1 wherein each n is one, y is zero, and x is from 25 to 75.
3. A fabric is defined in claim 2 which is a polyamide.
4. A fabric as defined in claim 3 wherein the siloxane is

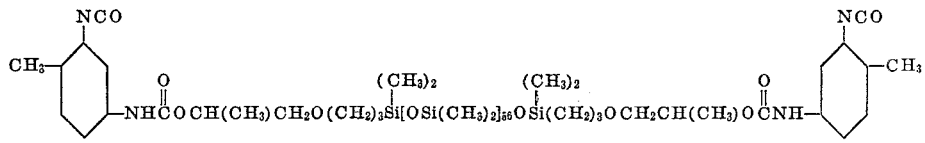

5. A fabric as defined in claim 1 which is a polyamide and wherein the siloxane is

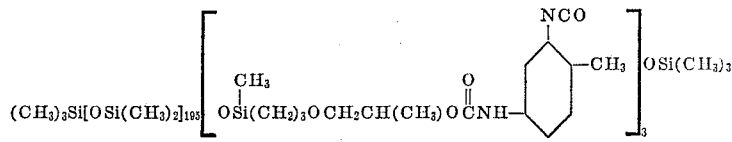

6. A fabric as defined in claim 1 which is a polyester and wherein the siloxane is

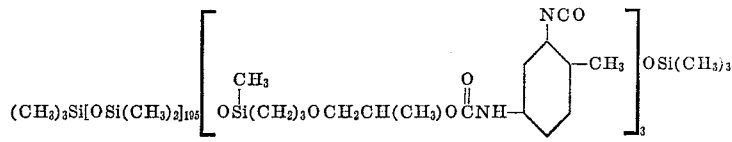

7. A fabric as defined in claim 2 which is a polyester.
8. A fabric as defined in claim 7 wherein the siloxane is

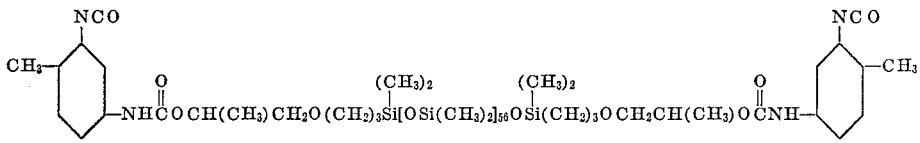

References Cited
UNITED STATES PATENTS

| | | | |
|---|---|---|---|
| 2,588,365 | 3/1952 | Dennett | 117—161 |
| 2,588,366 | 3/1952 | Dennett | 117—161 |
| 2,807,601 | 9/1957 | Dennett | 117—161 X |
| 2,893,898 | 7/1959 | Evans et al. | 117—161 |
| 2,895,853 | 7/1959 | Bailey et al. | 117—161 X |
| 3,179,622 | 4/1965 | Haluska | 117—139.5 X |
| 3,382,095 | 5/1968 | Haluska | 117—139.5 |
| 3,170,891 | 2/1965 | Speier | 260—37 |

WILLIAM D. MARTIN, Primary Examiner

T. G. DAVIS, Assistant Examiner

U.S. Cl. X.R.

117—139.5, 161